United States Patent
Yoon et al.

(10) Patent No.: US 9,113,106 B2
(45) Date of Patent: Aug. 18, 2015

(54) METHOD FOR PROVIDING LIST OF CONTENTS AND DISPLAY APPARATUS APPLYING THE SAME

(75) Inventors: Yeo-ri Yoon, Suwon-si (KR); Chang-soo Lee, Seoul (KR); Sang-hee Lee, Seoul (KR); Dae-Hyun Kim, Suwon-si (KR); Eung-nan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 604 days.

(21) Appl. No.: 13/074,206

(22) Filed: Mar. 29, 2011

(65) Prior Publication Data

US 2012/0017179 A1    Jan. 19, 2012

(30) Foreign Application Priority Data

Jul. 15, 2010 (KR) ........................ 10-2010-0068566

(51) Int. Cl.
*G06F 3/048* (2013.01)
*H04N 5/445* (2011.01)
*H04N 21/431* (2011.01)
*H04N 21/443* (2011.01)
*H04N 21/482* (2011.01)
*H04N 21/45* (2011.01)
*H04N 21/478* (2011.01)

(52) U.S. Cl.
CPC .......... *H04N 5/445* (2013.01); *H04N 21/4312* (2013.01); *H04N 21/4438* (2013.01); *H04N 21/482* (2013.01); *H04N 21/4532* (2013.01); *H04N 21/478* (2013.01)

(58) Field of Classification Search
None
See application file for complete search history.

(56) References Cited

U.S. PATENT DOCUMENTS

| | | | |
|---|---|---|---|
| 6,690,391 B1 * | 2/2004 | Proehl et al. | 715/720 |
| 7,058,635 B1 * | 6/2006 | Shah-Nazaroff et al. | 1/1 |
| 7,363,591 B2 * | 4/2008 | Goldthwaite et al. | 715/763 |
| 7,707,506 B2 * | 4/2010 | Weigel et al. | 715/738 |
| 2002/0069418 A1 * | 6/2002 | Philips | 725/87 |
| 2003/0164844 A1 * | 9/2003 | Kravitz et al. | 345/700 |
| 2004/0001081 A1 | 1/2004 | Marsh | |
| 2005/0229227 A1 * | 10/2005 | Rogers | 725/115 |
| 2006/0020904 A1 * | 1/2006 | Aaltonen et al. | 715/850 |
| 2006/0139461 A1 * | 6/2006 | Matsui et al. | 348/231.2 |
| 2006/0184966 A1 | 8/2006 | Hunleth et al. | |
| 2007/0033007 A1 * | 2/2007 | Narahara et al. | 704/9 |
| 2007/0204238 A1 * | 8/2007 | Hua et al. | 715/838 |
| 2008/0092173 A1 * | 4/2008 | Shannon et al. | 725/47 |

(Continued)

FOREIGN PATENT DOCUMENTS

EP    1762947 A2    3/2007

OTHER PUBLICATIONS

Communication from the European Patent Office issued Jul. 19, 2012 in counterpart European Application No. 11172598.2.

(Continued)

*Primary Examiner* — Stephen Alvesteffer
(74) *Attorney, Agent, or Firm* — Sughrue Mion, PLLC

(57) ABSTRACT

A method for providing a list of contents and a display apparatus applying the same are provided. The method displays images corresponding to a plurality of items included in a specific category of contents. If one of the displayed images is selected, a list of contents included in the item corresponding to the selected image is displayed. Accordingly, a user can easily identify what the item represents by viewing the image corresponding to the item.

15 Claims, 8 Drawing Sheets

(56) References Cited

U.S. PATENT DOCUMENTS

| | | |
|---|---|---|
| 2008/0104058 A1 | 5/2008 | Billmaier et al. |
| 2009/0083164 A1* | 3/2009 | Hull et al. ................. 705/27 |
| 2009/0293014 A1* | 11/2009 | Meuninck et al. ............ 715/810 |
| 2010/0023862 A1* | 1/2010 | Tai et al. ................. 715/721 |
| 2010/0031162 A1* | 2/2010 | Wiser et al. ................. 715/747 |
| 2010/0153999 A1 | 6/2010 | Yates |
| 2010/0180305 A1* | 7/2010 | Migos ................. 725/45 |

OTHER PUBLICATIONS

Communication dated May 4, 2015 issued by European Patent Office in counterpart European Application No. 11172598.2.

* cited by examiner

FIG. 6

METHOD FOR PROVIDING LIST OF CONTENTS AND DISPLAY APPARATUS APPLYING THE SAME

CROSS-REFERENCE TO RELATED APPLICATION

This application claims priority from Korean Patent Application No. 10-2010-0068566, filed on Jul. 15, 2010, in the Korean Intellectual Property Office, the entire disclosure of which is incorporated herein by reference in its entirety.

BACKGROUND

1. Field

Methods and apparatuses consistent with exemplary embodiments relate generally to providing a list of contents and a display apparatus applying the same, and more particularly to providing a list of contents, displaying a list of contents corresponding to an item of a specific category selected by a user, and a display apparatus applying the same.

2. Description of the Related Art

Recently, the technology for providing many contents using various multimedia devices has been rapidly developing. As the technology for the storage medium for storing contents has developed, it is now possible to store many contents in a single device. The contents can be provided from not only the storage space of the device, but also an external source connected to the device through the Internet or other communication network.

Accordingly, the number of contents that can be used through a single multimedia device has also rapidly increased, and thus it is difficult for a user to find a desired content from the numerous contents.

What is needed is a device that can easily search for the content that a user wishes to find among the numerous available contents.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a method for providing a list of contents which displays images corresponding to a plurality of items included in a specific category of contents, and, which displays a list of contents included in an item corresponding to an image upon selection of one of the displayed images, and a display apparatus applying the same.

According to an aspect of an exemplary embodiment, there is provided a method for providing a list of contents, including: displaying images corresponding to a plurality of items included in a specific category of contents, and displaying a list of contents included in an item corresponding to an image upon selection of one of the displayed images.

Each of the images may be an image relating to one of the contents included in the corresponding item.

Each of the images may be a thumbnail image relating to a scene of one of the contents included in the corresponding item.

Each of the images may be an image relating to a content of a highest rank among the contents included in the corresponding item.

The displaying the images may include displaying the images along with text, wherein the text includes titles of the items corresponding to the images.

The category may include a mood of the contents, and the plurality of items within the category of mood may include at least one of "Exciting," "Happy," "Sad" and "Thrilled."

The displaying the images may include displaying images corresponding to items included in the category of "mood,", and the displaying the list of contents may include displaying a content recommendation list for recommending contents corresponding to the item of the category of "mood" from among a plurality of contents.

The category and the items included in the category are configured using information in metadata of the contents.

According to an aspect of another exemplary embodiment, there is provided a display apparatus including: a display unit displaying a plurality of images, and a controller which controls the images to display on the display unit in order to display images corresponding to a plurality of items included in a specific category of contents, and displays a list of contents included in an item corresponding to an image upon selection of one of the displayed images.

Each of the images may be an image relating to one of the contents included in the corresponding item.

Each of the images may be a thumbnail image relating to a scene of one of the contents included in the corresponding item.

Each of the images may be an image relating to a content of a highest rank among the contents included in the corresponding item.

The controller may control text to display on the display unit, wherein the text includes titles of the items corresponding to the images.

The category may include a mood of the contents, and the plurality of items within the category of mood may include at least one of "Exciting," "Happy," "Sad" and "Thrilled."

The controller may control the images to display on the display unit in order to display images corresponding to items included in the category of "mood," and displays a content recommendation list for recommending contents corresponding to the category of "mood" from among a plurality of contents.

The category and the items included in the category may be configured using information in metadata of the contents.

According to an aspect of another exemplary embodiment, there is provided a method of classifying and displaying content on a display, comprising classifying a plurality of content into a plurality of categories;

classifying the plurality of content into a plurality of items, wherein the items are further classifications of the plurality of categories; displaying images for each of the plurality of categories on a display; and displaying images for the plurality of items on the display, wherein the images for the plurality of items correspond to images of the plurality of content classified within each respective item.

The plurality of content may be a plurality of movies.

The movies may be classified into categories according to information about the movie. The information about the movie may be obtained from metadata in the movie.

According to diverse exemplary embodiments, the method for providing a list of contents displays images corresponding to a plurality of items included in a specific category of contents. If one of the displayed images is selected, a list of contents included in the items corresponding to the selected image is displayed. A display apparatus applying the same is also provided. Accordingly, the user can easily identify what the item represents by viewing the image corresponding to the item.

In particular, in the case of the category of "mood," it is difficult for the user to know what mood the item represents by its text only. However, since the image relating to a representative content is displayed for the item of the category of "mood," the user can easily identify what mood the item represents.

Additional aspects and advantages of the exemplary embodiments will be set forth in the detailed description, will be apparent from the detailed description, or may be learned by practicing the exemplary embodiments.

BRIEF DESCRIPTION OF THE DRAWINGS

The above and/or other aspects will be more apparent from the following description of exemplary embodiments, taken in conjunction with the accompanying drawings, in which:

FIG. 6 is an illustration of a screen on which a list of contents relating to an item of an "Exciting" mood are displayed, according to an exemplary embodiment;

DETAILED DESCRIPTION OF THE EXEMPLARY EMBODIMENTS

Figure 1:
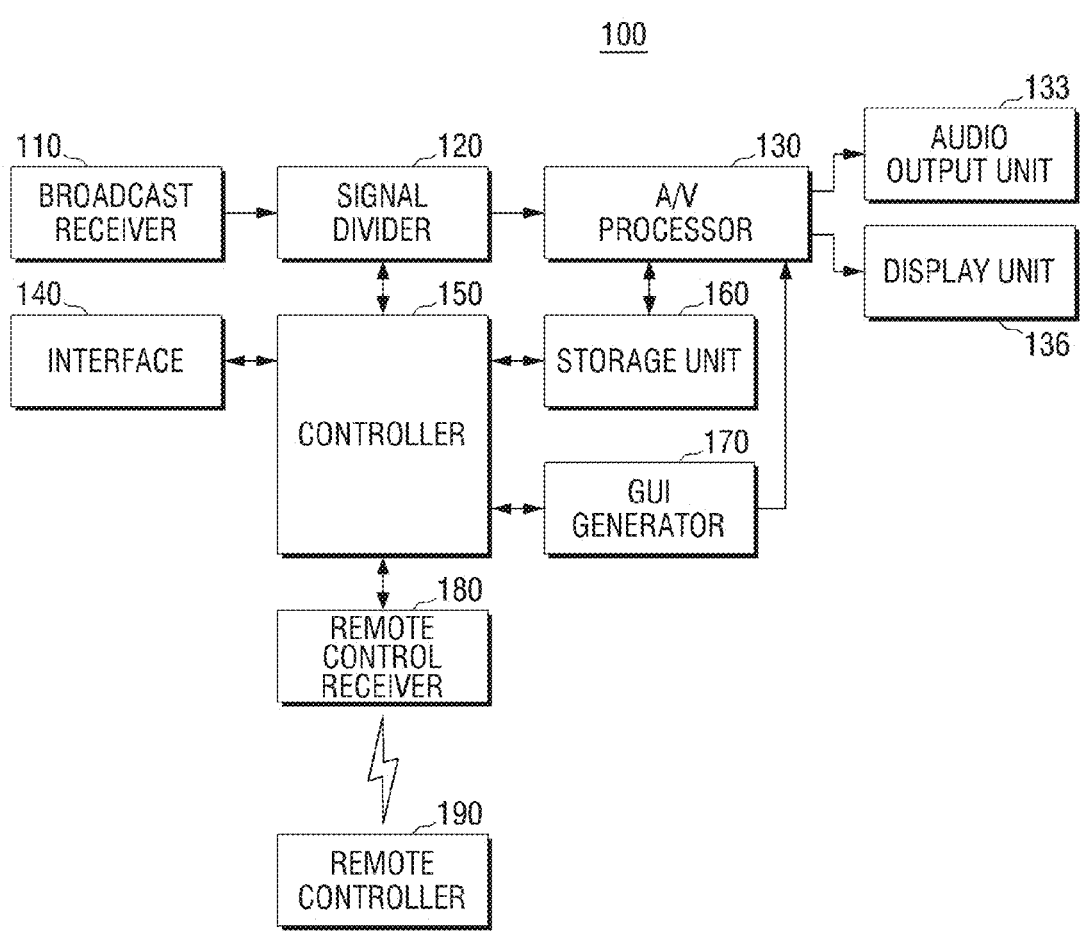
FIG. 1 is a block diagram illustrating components of a television (TV), according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating components of a television (TV) 100, according to an exemplary embodiment. As shown in FIG. 1, the TV 100 includes a broadcast receiver 110, a signal divider 120, an A/V processor 130, an audio output unit 133, a display unit 136, an interface 140, a controller 150, a storage unit 160, a graphical user interface (GUI) generator 170, and a remote control receiver 180.

The broadcast receiver 110 receives a broadcast from a broadcasting station or a satellite by wire or wirelessly and tunes to the broadcast. The broadcast receiver 110 may include a plurality of tuners (not shown) to receive broadcast signals through a plurality of channels simultaneously.

The signal divider 120 divides the broadcast signal into a video signal, an audio signal, and electronic program guide (EPG) information. The signal divider 120 transmits the video signal and the audio signal to the A/V processor 130 and transmits the EPG information to the GUI generator 170.

The A/V processor 130 performs signal-processing such as video decoding, video scaling, and audio decoding with respect to the video signal and the audio signal input from the signal divider 120 and the interface 140. Also, the A/V processor 130 outputs the video signal to the display unit 136 and outputs the audio signal to the audio output unit 133.

The A/V processor 130 may output the video signal and the audio signal in a compressed format to the storage unit 160 or the interface 140 in order to store the video signal and the audio signal in the storage unit 160 or transmit the video signal and the audio signal to an external apparatus through the interface 140.

The audio output unit 133 outputs a sound output from the A/V processor 130 through a speaker or outputs the sound to an external apparatus such as an external speaker connected through an external output port (not shown).

The display unit 136 displays an image output from the A/V processor 130 on a display (not shown) or outputs the image to an external apparatus such as an external display connected through an external output port. Also, the display unit 136 may display menus generated by the GUI generator 170. For example, the display unit 136 may display a category selection screen, an item selection screen for each category, and a content list screen, all of which will be described and illustrated in further detail below.

The interface 140 connects the TV 100 to a communication network (not shown) such as the Internet or another video apparatus. Also, the interface 140 receives contents from the Internet or an external apparatus. When the interface 140 receives contents, such as a video file, the interface 140 transmits the received video file to the controller 150.

The storage unit 160 stores a variety of contents. For example, the storage unit 160 may store video contents such as movie contents and music video contents.

The storage unit 160 records the broadcast received by the broadcast receiver 110 and stores the recorded broadcast as a recorded file of video content. The storage unit 160 may store a video content copied by the user in addition to a recorded broadcast. Also, the storage unit 160 may output the stored video contents to the A/V processor 130. The storage unit 160 may be realized as a hard disk or a non-volatile memory.

The GUI generator 170 generates a GUI to be displayed on the display and adds the generated GUI to the image output from the A/V processor 130. Particularly, the GUI generator 170 may generate GUIs relating to a screen for selecting a category of contents, a screen for selecting a category item of contents, and a screen regarding a list of contents.

A remote controller 190 receives a user's input and transmits the user's input to the TV 100 through the remote control receiver 180. For example, the user may select a program that he or she wants to record using the remote controller 190. In addition, the user may input a replaying time using the remote controller 190 to replay a recorded file.

The controller 150 recognizes a user command based on the user's instruction transmitted from the remote controller 190, and the controller 150 then controls an overall operation of the TV 100 according to the user command.

Specifically, if a specific category of contents is selected by the user, the controller 150 controls the display unit 136 to display images corresponding to a plurality of items included in the selected specific category.

The category as described herein is a characteristic based on which contents are classified. Non-limiting examples of the category may be one of a genre, a mood, a subject, a director, an actor, and a releasing time.

The plurality of items included in the category refer to more detailed classifications of the contents in a corresponding category. In one non-limiting example, the items of the category of "mood" may include "Exciting," "Happy," "Sad" and "Thrilled." In another non-limiting example, the items of the category of "Genre" may include "Action," "Drama," "Romantic" and "Fantasy." Besides these classifications, each category may include a plurality of items.

The categories and the items included in each category may be configured, in one non-limiting example, by the controller 150 through the use of information about categories and items included in metadata of contents. However, the categories and the items thereof may be configured using any other method.

If the category is selected, the controller 150 displays images corresponding to the items of the selected category. An example of this operation is explained with reference to an item selection screen illustrated in FIGS. 4 and 7.

It may be difficult for a user to know what contents are included within the items of a category by viewing only the titles of the category items. For example, it may be difficult to know what contents are related to the items of the category of "Mood," such as "Exciting," "Happy," "Sad," and "Thrilled," by viewing the titles only.

Figure 4:
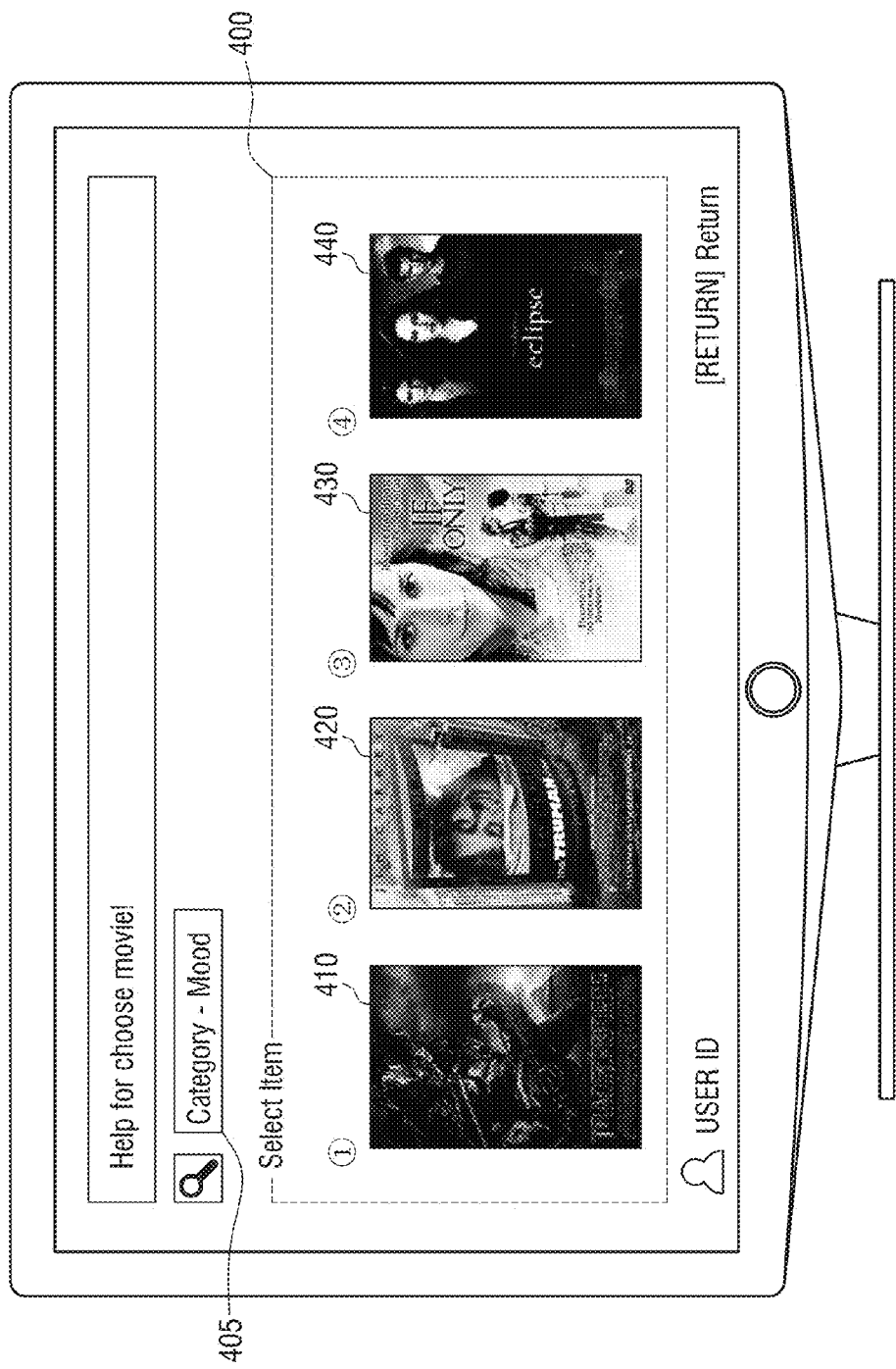
FIG. 4 is an illustration of a screen on which images corresponding to items of a category of "Mood" are displayed, according to an exemplary embodiment.

Therefore, in one exemplary embodiment shown in FIG. 4, the controller 150 displays an image 410, 420, 430, 440 representative of each respective item 1, 2, 3, 4 on the item selection screen 400. The image corresponding to each item may be an image relating to one of contents included in the item. In other words, the controller 150 selects a content representing the item from among the contents included in the item and displays an image 410, 420, 430, 440 relating to the selected content on the item selection screen 400 as a representative image of the item.

In one exemplary embodiment, the image corresponding to each item may be a thumbnail image relating to a scene of one of the contents included in the item. Also, the image corresponding to each item may be a poster image (i.e., a movie poster image) relating to one of the contents included in the item.

For example, assuming that the item "of "Exciting" of the category of "Mood" includes a content "A," a content "B," and a content "C," and the controller selects the content "B" as a representative content of the item of "Exciting" of the category of "Mood," the controller 150 displays a thumbnail image or a movie poster relating to the content B on the item selection screen 400 for the category of "Mood" as an image corresponding to the item of "Exciting."

In one exemplary embodiment, the controller 150 may select a content of a highest rank as a representative content of the item from among the contents included in a specific item. The term "rank" as recited herein refers to, in one non-limiting example, information on the ranking of contents provided from various Internet movie sites. For example, an Internet movie site ranks movies according to a genre or a mood using a ranking algorithm thereof. Thereafter, the controller 150 receives the ranking information from the Internet movie site and selects a representative content for a specific item using the received ranking information.

As described above, the controller 150 then displays the images corresponding to the items included in the category of "mood."

Figure 5:
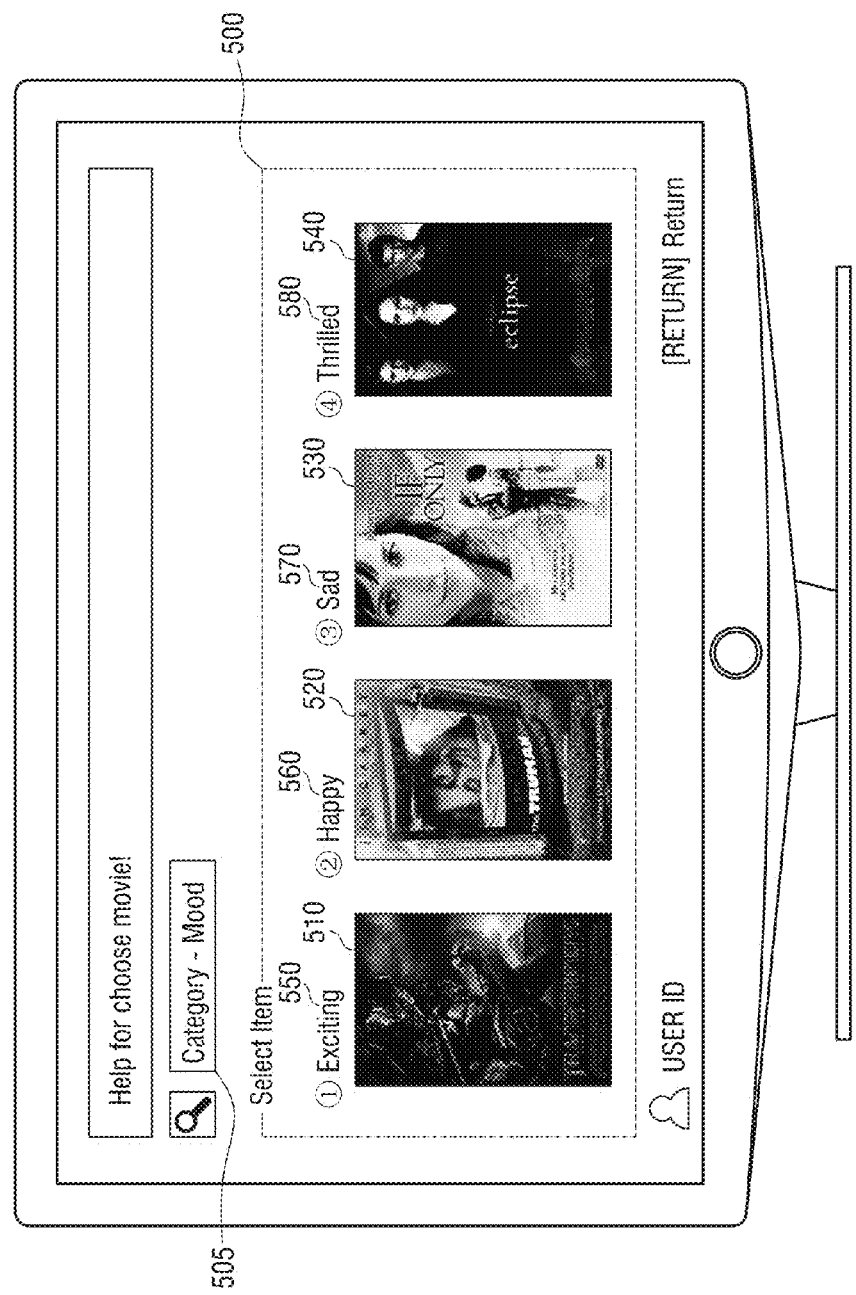
FIG. 5 is an illustration of a screen on which images corresponding to items of a category of "Mood" are displayed along with text, according to an exemplary embodiment.
Figure 8:
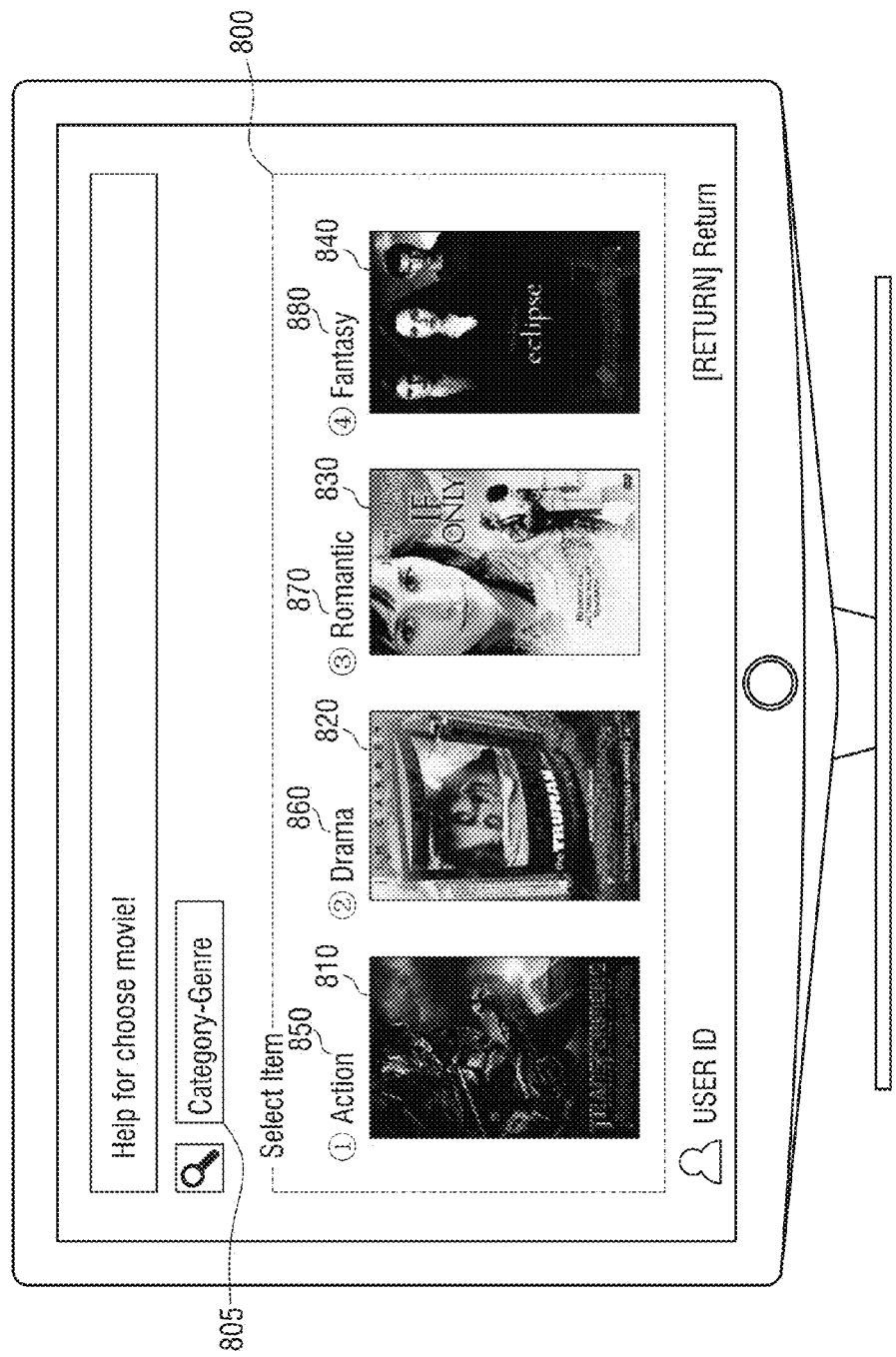
FIG. 8 is an illustration of a screen on which images corresponding to of a category of "Genre" are displayed along with text, according to an exemplary embodiment.

In another exemplary embodiment, the controller 150 may display text indicating the titles of the items along with the corresponding images. In other words, the controller 150 displays the images corresponding to the items and displays the titles corresponding to the items around the images. This is illustrated in FIGS. 5 and 8 by way of example.

If one of the images displayed is selected, the controller 150 displays a list of contents included in the item corresponding to the selected image. For example, if one of the images corresponding to the items included in the category of "mood" is selected, the controller 150 may display a content recommendation list recommending contents of the item corresponding to the selected image.

Since the TV 100 displays the images corresponding to the items on the item selection screen of the specific category, the user can easily identify what the item represents using the image corresponding to the item.

Particularly, in the case of the category of "mood", it may be difficult for the user to know what the title "mood" represents by its text only. However, since the TV 100 displays the items included in the category of "mood" along with the images of representative contents, the user can easily know what type of mood the items included in the category of "mood" indicate.

Also, in the above exemplary embodiment, only the items of the category of "mood" have been described. However, this is merely an example for convenience of explanation. Therefore, the TV 100 may display items and images from any other category, such as a genre and a director.

Figure 2:
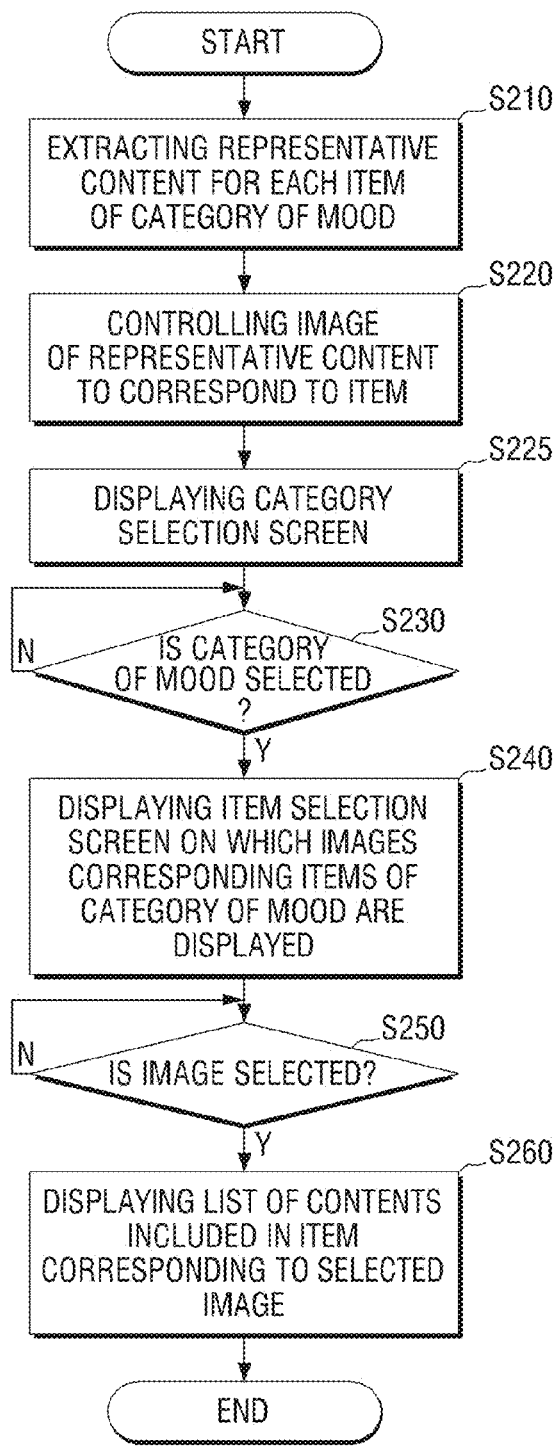
FIG. 2 is a flowchart illustrating a method for providing a list of contents, according to an exemplary embodiment.

FIG. 2 is a flowchart illustrating a method for providing a list of contents, according to an exemplary embodiment.

In FIG. 2, the TV 100 extracts a representative content for each of the items included in the category of "mood" (S210). The TV 100 may select a content of a highest rank from contents included in each item as a representative content of the item. In one exemplary embodiment, the rank recited herein refers to information on the ranking of contents provided from various Internet movie sites. For example, an Internet movie site may rank movies according to a genre or a mood using a rank selecting algorithm thereof. The TV 100 receives the rank information from the Internet movie site and extracts a representative content for a specific item using the received rank information.

The TV 100 displays an image of the representative content to correspond to each item (S220). In other words, the TV 100 selects the representative content from the contents included in one item and displays an image relating to the selected content on the item selection screen as a representative image of the item.

In one exemplary embodiment, the image corresponding to each item may be a thumbnail image relating to a scene of one of the contents included in the item. The image corresponding to each item may also be a poster image (i.e., a movie poster image) relating to one of the contents included in the item.

For example, the item of "Exciting" of the category of "Mood" may include a content "A," a content "B," and a content "C." If the TV 100 selects the content "B" as a representative content of the item of "Exciting," the TV 100 displays a thumbnail image or a movie poster relating to the content "B" on the item selection screen as a representative image of the item of "Exciting."

After that, if a command to display a category selection screen is input from the user, the TV 100 displays the category selection screen (S225). The category selection screen refers to a GUI screen through which a plurality of categories classifying contents are displayed, and where one category may be selected from a plurality of categories. This will be explained in detail below with regard to FIG. 3.

Figure 3:
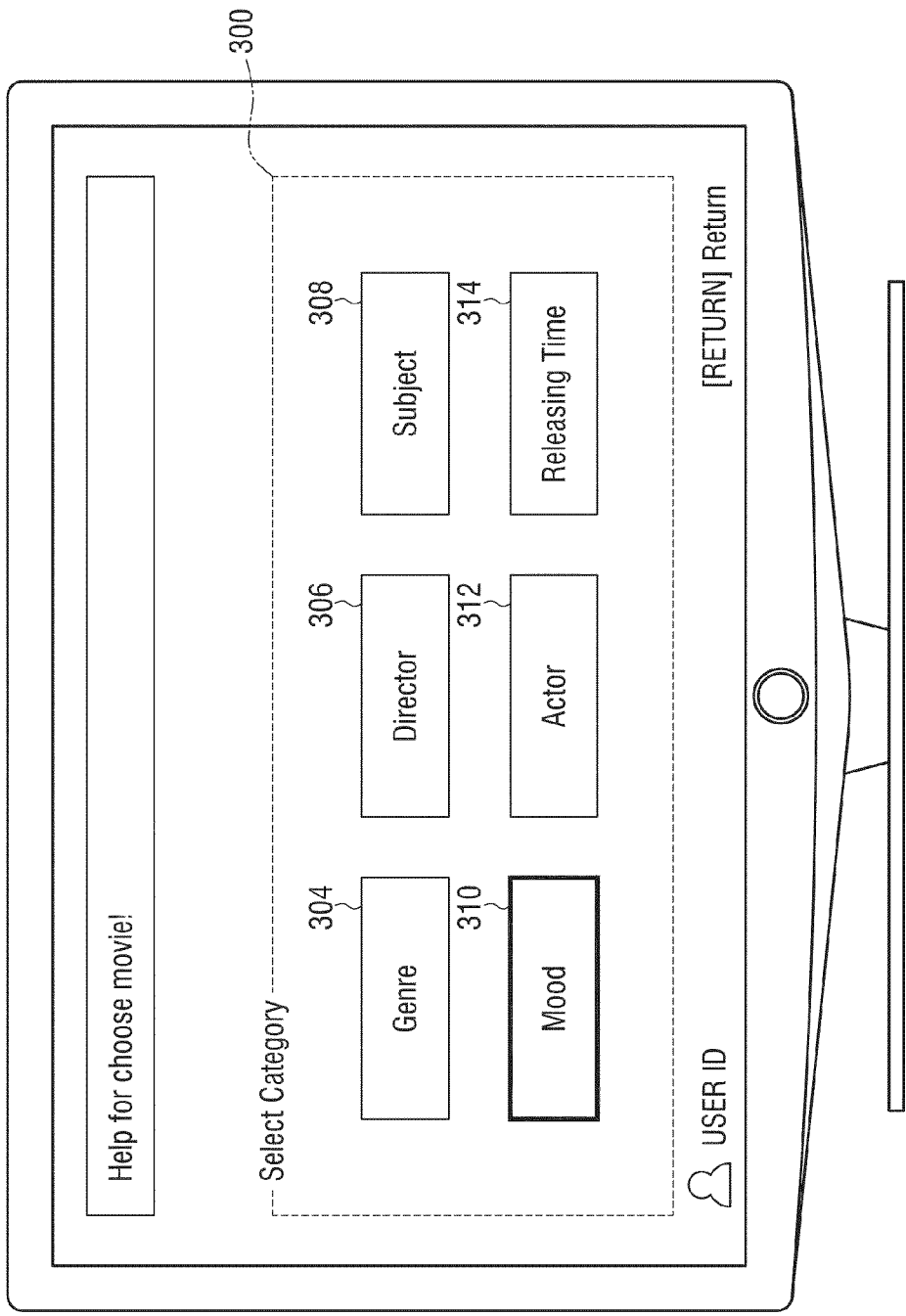
FIG. 3 is an illustration of a screen for selecting a category to recommend a content, according to an exemplary embodiment.

FIG. 3 is an illustration of a screen for selecting a category of recommended content, according to an exemplary embodiment. As shown in FIG. 3, a category selection screen 300 displays selectable categories. Specifically, the category selection screen 300 displays categories of "Genre" 304, "Director" 306, "Subject" 308, "Mood" 310, "Actor" 312 and "Releasing Time" 314.

If the category of "Mood" 310 is selected by the user, the TV 100 displays a screen for selecting items of the category of "Mood." This will be explained in detail below with regard to FIGS. 4 and 5.

Referring back to FIG. 2, the TV 100 determines whether the category of "Mood" is selected on the category selection screen 300 (S230). If the category of "Mood" is selected (S230), the TV 100 displays an item selection screen on which images corresponding to the items of the category of "Mood" are displayed (S240). In other words, if a specific category is selected by the user, the TV 100 displays the images corresponding to a plurality of items included in the selected specific category on the item selection screen.

It may be difficult for a user to know what the items of the category are just by viewing the titles of the category items. For example, it is difficult to know what the detailed items of the category of "Mood", such as "Exciting", "Happy", "Sad", and "Thrilled" indicate by their titles only.

Therefore, the TV 100 displays a representative image 410, 420, 430 and 440 of each item on an item selection screen 400, as shown in FIG. 4. Hereinafter, the item selection screen will be explained in detail with reference to FIGS. 4 and 5.

FIG. 4 is an illustration of a screen on which images corresponding to the items of the category of "Mood" are displayed. Referring to a current category display 405 in FIG. 4, the currently selected category is "Mood."

Also, images 410, 420, 430 and 440 corresponding to four items are displayed on the item selection screen 400. The first image 410 corresponds to an item of "Exciting" of the category of "Mood;" the second image 420 corresponds to an item of the mood "Happy;" the third image 430 corresponds to an item of the mood "Sad;" and the fourth image 440 corresponds to an item of the mood "Thrilled."

As described above, the first image 410, the second image 420, the third image 430 and the fourth image 440 are movie poster images representing their respective items. However, the images 410, 420, 430 and 440 may be a thumbnail image relating to one scene of the movie to which the item refers.

Since the movie image 410, 420, 430 and 440 representing each item is displayed on the item selection screen 400, the user can easily identify what mood each item represents.

In another exemplary embodiment, the TV 100 may display text indicating the titles of the items along with the corresponding images. In other words, the TV 100 may display the images corresponding to the items as well as the titles of the items near the images. This will be explained below with regard to FIG. 5. FIG. 5 is an illustration of a screen on which the images 510, 520, 530 and 540 corresponding to the items of the category of "Mood" are displayed along with text indicating the titles 550, 560, 570 and 580 of each of the items.

Referring to a current category display 505 in FIG. 5, the currently selected category is "Mood."

Also, images 510, 520, 530 and 540 corresponding to four items are displayed on an item selection screen 500 and the text indicating the titles 550, 560, 570 and 580 of the items are displayed along with the images. In other words, on the item selection screen 500 of FIG. 5, the first image 510 is displayed along with the title "Exciting" 550; the second image 520 is displayed along with the title "Happy" 560; the third image 520 is displayed along with the title "Sad" 570; and the fourth image 540 is displayed along with the title "Thrilled" 580.

As described above, the first, the second, the third, and the fourth images 510, 520, 530 and 540 are movie poster images representing the items and displayed along with the titles 550, 560, 570 and 580 of the items. Therefore, the user can identify what mood each item represents more clearly.

Referring back to FIG. 2, the TV 100 determines whether a specific image is selected by the user on the item selection screen (S250). If a specific image is selected (S250-Y), the TV 100 displays a list of contents that are included in the item corresponding to the selected image (S260). In other words, the TV 100 recommends the contents corresponding to the selected item of the category of "Mood" and displays a content recommendation list. A content list screen will be explained in detail below with reference to FIG. 6.

Figure 6:
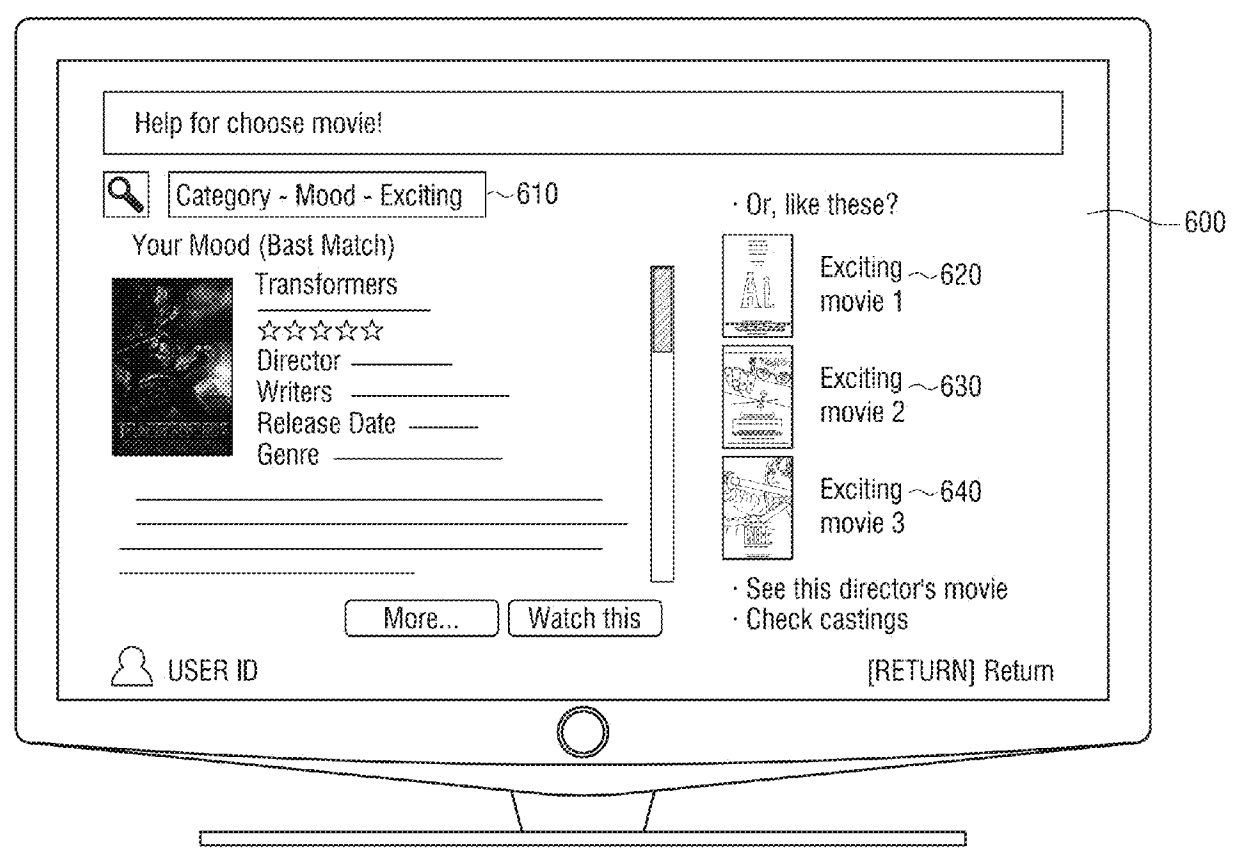

FIG. 6 is an illustration of a screen on which a list of contents related to the item of "Exciting" is displayed, according to an exemplary embodiment. If the first image 410 is selected in FIG. 4, the TV 100 recognizes that the item of "Exciting" is selected and displays a content list screen 600, as shown in FIG. 6.

As shown in FIG. 6, the TV 100 displays information regarding a representative content 610 of the selected item "Exciting" on the content list screen 600, and displays other contents of the item of "Exciting" such as "Exciting movie 1" 620, "Exciting movie 2" 630 and "Exciting movie 3" 640 on the right portion of the screen 600.

In other words, the TV 100 displays a list of contents which recommends the contents 610, 620, 630 and 640 corresponding to the item of "Exciting" to the user.

Through the above-described process, the TV 100 is able to display the images corresponding to the items on the item selection screen of a specific category. Therefore, the user can easily identify what the item represents using the corresponding image.

Particularly, in the case of the category of "Mood", it may be difficult for the user to identify what the category represents by its text only. However, since the item is displayed along with the image of the representative content of the item, the user can easily identify what mood the item represents.

In the above exemplary embodiment, only the items relating to the category of "Mood" have been explained, but this is merely an example. Therefore, any other category, such as a genre or a director may be displayed and selected on the TV 100.

In another exemplary embodiment, the category of "Genre" will be explained with regard to FIGS. 7 and 8.

Figure 7:
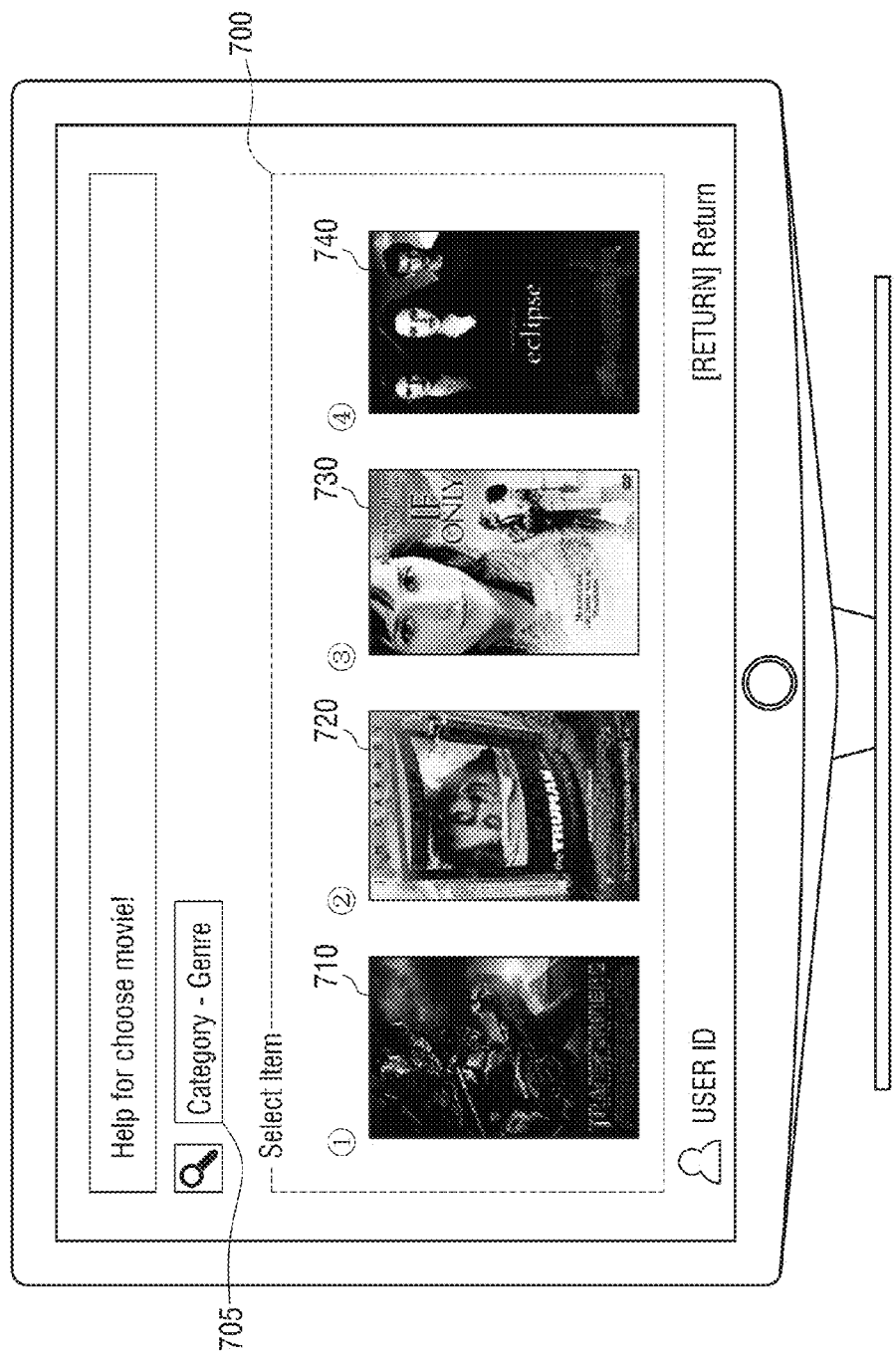
FIG. 7 is an illustration of a screen on which images corresponding to items of a category of "Genre" are displayed, according to an exemplary embodiment.

FIG. 7 is an illustration of a screen on which images corresponding to items of the category of "Genre" are displayed, according to an exemplary embodiment.

Referring to a current category display 705 in FIG. 7, the currently selected category is "Genre."

Also, images 710, 720, 730 and 740 corresponding to four items are displayed on an item selection screen 700. The first image 710 corresponds to an item of "Action" of the category of "Genre;" the second image 720 corresponds to an item of "Drama;" the third image 730 corresponds to an item of "Romantic;" and the fourth image 740 corresponds to an item of "Fantasy."

As described above, the first image 710, the second image 720, the third 730, and the fourth image 740 are movie poster images representing the items. However, the images may be thumbnails relating to one scene of the movie to which the item refers.

As described above, since the items are displayed on the item selection screen 700 along with the movie images 710, 720, 730 and 740 representing the items, the user can easily identify which genre each item represents.

The TV 100 may also display text indicating the titles of the items along with the images corresponding to the items. In other words, the TV 100 may display the images corresponding to the items and may display the titles of the items near the images. This will be explained below with regard to FIG. 8.

FIG. 8 is an illustration of a screen on which the images corresponding to the items of the category of "Genre" are displayed along with the text indicating the titles 710, 720, 730 and 740 of each of the items.

Referring to a current category display 805 in FIG. 8, the currently displayed category is "Genre."

Also, on an item selection screen 800, images 810, 820, 830 and 840 corresponding to four items are displayed and the titles 850, 860, 870 and 880 of the items are displayed along with the images 810, 820, 830 and 840. In other words, on the item selection screen of FIG. 8, the first image 810 is displayed along with the title "Action" 850; the second image 820 is displayed along with the title "Drama" 860; the third image 830 is displayed along with the title "Romantic" 870; and the fourth image 840 is displayed along with the title "Fantasy" 880.

As described, the first image 810, the second image 820, the third image 830, and the fourth image 840 are movie poster images representing the items and are displayed along with the titles 850, 860, 870 and 880 of the items. Accordingly, the user can identify which genre each item represents more easily.

The display apparatus described above is a TV. However, any display apparatus can be used that can reproduce contents and display category items of the contents. For example, the display apparatus may be a mobile phone, a portable multimedia player (PMP) or an MP3 player.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for displaying a list of contents, the method comprising:
    displaying images corresponding to a plurality of items included in a specific category of contents on an item selection area of a screen and information identifying the specific category on a category display area of the screen, the item selection area being separated from the category display area; and
    upon selection of one of the displayed images, displaying a list of contents included in an item corresponding to the selected image on the screen and information identifying both the specific category and the item corresponding to the selected image on the category display area of the screen,
    wherein the plurality of items included in the specific category include a first item and a second item, and the displayed images include a first image and a second image corresponding to the first item and the second item,
    wherein the first image of the displayed images is an image of a representative content among a first list of contents included in the first item of the plurality of items, and the second image of the displayed images is an image of a representative content among a second list of contents included in the second item of the plurality of items, and
    wherein the representative content among the first list of contents included in the first item is a content of a highest rank among the first list of contents included in the first item, and the representative content among the second list of contents included in the second item is a content of a highest rank among the second list of contents included in the second item.

2. The method according to claim 1, wherein each of the images is a thumbnail image relating to a scene of one of the contents included in the corresponding item.

3. The method according to claim 1, wherein the displaying the images comprises displaying the images along with text, and wherein the text includes titles of the items corresponding to the images.

4. The method according to claim 1, wherein the category includes a mood of the contents, and
    wherein the plurality of items within the category of mood includes at least one of "Exciting," "Happy," "Sad" and "Thrilled."

5. The method according to claim 4, wherein the displaying the images comprises displaying images corresponding to items included in the category of "mood," and
    wherein the displaying the list of contents comprises displaying a content recommendation list for recommending contents corresponding to the item of the category of "mood" from among a plurality of contents.

6. The method according to claim 1, wherein the category and the items included in the category are configured using information in metadata of the contents.

7. A display apparatus comprising:
    a display unit which displays a plurality of images; and
    a controller which controls the display unit to display images corresponding to a plurality of items included in a specific category of contents on an item selection area of a screen, and information identifying the specific category on a category display area of the screen, the item selection area being separated from the category display area, wherein if one of the images is selected, the controller controls the display unit to display a list of contents included in an item corresponding to the selected image on the screen and information identifying both the specific category and the item corresponding to the selected image on the category display area of the screen,
    wherein the plurality of items included in the specific category include a first and a second item, and the displayed images include a first image and a second image corresponding to the first item and the second item,
    wherein the first image of the displayed images is an image of a representative content among a first list of contents included in the first item of the plurality of items, and the second image of the displayed images is an image of a representative content among a second list of contents included in the second item of the plurality of items, and
    wherein the representative content among the first list of contents included in the first item is a content of a highest rank among the first list of contents included in the first item, and the representative content among the second list of contents included in the second item is a content of a highest rank among the second list of contents included in the second item.

8. The display apparatus according to claim 7, wherein each of the images is a thumbnail image relating to a scene of one of the contents included in the corresponding item.

9. The display apparatus according to claim 7, wherein the controller controls text to display on the display unit, wherein the text includes titles of the items corresponding to the images.

10. The display apparatus according to claim 7, wherein the category includes a mood of the contents, and
 wherein the plurality of items within the category of mood includes at least one of "Exciting," "Happy," "Sad" and "Thrilled."

11. The display apparatus according to claim 10, wherein the controller controls the images to display on the display unit in order to display images corresponding to items included in the category of "mood," and displays a content recommendation list for recommending contents corresponding to the category of "mood" from among a plurality of contents.

12. A method of classifying and displaying content on a display, the method comprising:
 classifying a plurality of content into a plurality of categories;
 classifying the plurality of content into a plurality of items, wherein the items are further classifications of the plurality of categories;
 displaying images corresponding to a plurality of items included in a specific category of the plurality of categories in an item selection area of a display and information identifying the specific category in a current category display area on the display, the item selection area being separated from the category display area; and
 if one of the images is selected, displaying images for a list of contents included in an item corresponding to the selected image on the display and information identifying both the specific category and the item corresponding to the selected image in the category display area on the display, wherein the images for the list of contents correspond to images of a plurality of contents classified within the item,
 wherein the plurality of items included in the specific category include a first item and a second item, and the displayed images include a first image and a second image corresponding to the first item and the second item,
 wherein the first image of the displayed images is an image of a representative content among a first list of contents included in the first item of the plurality of items, and the second image of the displayed images is an image of a representative content among a second list of contents included in the second item of the plurality of items, and
 wherein the representative content among the first list of contents included in the first item is a content of a highest rank among the first list of contents included in the first item, and the representative content among the second list of contents included in the second item is a content of a highest rank among the second list of contents included in the second item.

13. The method according to claim 12, wherein the plurality of contents area plurality of movies.

14. The method according to claim 13, wherein the movies are classified into categories according to information about the movie.

15. The method according to claim 14, wherein the information about the movie is obtained from metadata in the movie.

* * * * *